(12) United States Patent
Azami et al.

(10) Patent No.: US 9,120,324 B2
(45) Date of Patent: Sep. 1, 2015

(54) INK JET RECORDING METHOD, INK JET RECORDING APPARATUS, AND RECORDED MATTER

(71) Applicant: Seiko Epson Corporation, Tokyo (JP)

(72) Inventors: Yoshiko Azami, Matsumoto (JP); Takashi Koase, Shiojiri (JP); Hiroshi Mukai, Shiojiri (JP)

(73) Assignee: Seiko Epson Corporation (JP)

( * ) Notice: Subject to any disclaimer, the term of this patent is extended or adjusted under 35 U.S.C. 154(b) by 335 days.

(21) Appl. No.: 13/851,487

(22) Filed: Mar. 27, 2013

(65) Prior Publication Data
US 2013/0300797 A1 Nov. 14, 2013

(30) Foreign Application Priority Data

May 14, 2012 (JP) .................. 2012-110491

(51) Int. Cl.
| | |
|---|---|
| *B41J 2/21* | (2006.01) |
| *C09D 11/30* | (2014.01) |
| *C09D 11/40* | (2014.01) |
| *C09D 11/322* | (2014.01) |

(52) U.S. Cl.
CPC ........ *B41J 2/21* (2013.01); *B41J 2/2107* (2013.01); *C09D 11/30* (2013.01); *C09D 11/322* (2013.01); *C09D 11/40* (2013.01)

(58) Field of Classification Search
CPC .............. B41J 2/01; B41J 2/21; B41J 2/2107; C09D 11/30; C09D 11/32; C09D 11/322; C09D 11/324; C09D 11/40

USPC .................... 347/6, 95–100; 106/31.13, 31.6
See application file for complete search history.

(56) References Cited

U.S. PATENT DOCUMENTS

| | | | | |
|---|---|---|---|---|
| 6,084,604 | A * | 7/2000 | Moriyama et al. | 347/15 |
| 6,648,953 | B2 | 11/2003 | Yamazaki et al. | |
| 6,958,090 | B2 * | 10/2005 | Redfearn et al. | 106/31.6 |
| 7,503,968 | B2 * | 3/2009 | Koganehira | 106/31.6 |
| 7,775,653 | B2 * | 8/2010 | Kanaya et al. | 347/100 |
| 2004/0017406 | A1 * | 1/2004 | Kato et al. | 347/1 |

FOREIGN PATENT DOCUMENTS

| | | |
|---|---|---|
| JP | 11-061022 | 3/1999 |
| JP | 11-320922 | 11/1999 |

* cited by examiner

*Primary Examiner* — Matthew Luu
*Assistant Examiner* — Rut Patel
(74) *Attorney, Agent, or Firm* — Harness, Dickey & Pierce, P.L.C.

(57) ABSTRACT

An ink jet recording method using ink selected from a group including (A) black ink containing black pigment, (B) mixed color black ink containing black and color pigments, and (C) color ink containing color pigment, in which an ink glossiness at 60° is increased in the order of black ink (A), mixed color black ink (B), and color ink (C), the target recording surface glossiness at 60° in a target recording medium is 40 or more, and at least one of the following is satisfied: (1) A black image is formed using at least a plurality of types of the color ink of (C) and a color image is formed using the color ink of (C), and (2) A black image is formed using the mixed color black ink of (B) and a color image is formed using the color ink of (C).

24 Claims, No Drawings

INK JET RECORDING METHOD, INK JET RECORDING APPARATUS, AND RECORDED MATTER

Priority is claimed under 35 U.S.C. §119 to Japanese Application No. 2012-110491 filed on May 14, 2012, which is hereby incorporated by reference in its entirety.

BACKGROUND

1. Technical Field

The present invention relates to an ink jet recording method, an ink jet recording apparatus which uses the above recording method, and recorded matter which was obtained by the above recording method or the above recording apparatus.

2. Related Art

In the related art, printing methods which use an ink jet recording method have been executed by causing small droplets of ink to fly and be attached to a target recording medium such as paper. Due to innovative advances in ink jet recording method techniques in recent years, printing methods which use an ink jet recording method have also been used in the field of high resolution image recording (image printing) which up to then had used photographic or offset printing. In particular, various proposals have been made with regard to inks which are capable of obtaining high-quality images with respect to a target recording medium with an ink absorbing property such as plain paper and special paper for ink jet recording (for example, glossy paper).

For example, JP-A-11-320922 discloses an ink jet recording method where, when ejecting a black ink and color inks of cyan, magenta, and yellow, which have a greater permeability to the recording medium than the black ink, from various nozzles, forming a pattern of ink dots with variable sizes on the recording medium, and performing color recording with gradation, the black dots are formed using composite black in a case where at least a part of the black dots overlaps with the dots of colors other than black at positions which are adjacent to the black dots when the black dots are formed, and the black dots are formed with black ink in other cases. In addition, disclosure is made to the effect that, by using the above recording method, it is possible to reduce bleeding in the color boundary portions of the black and the colors (specification of JP-A-11-320922, paragraphs 0025 to 0035).

However, the ink jet recording method which is disclosed in JP-A-11-320922, there is a problem in that gloss unevenness is generated between a black region which is derived from black ink and a color region which is derived from color ink. Therefore, there is a need to improve the quality of the image.

SUMMARY

An advantage of some aspects of the invention is that it provides an ink jet recording method where it is possible to prevent the generation of gloss unevenness between a black region and a color region.

The present inventors carried out intensive research in order to solve the above-described problems. When researching the causes of the gloss unevenness, it was found that the difference in the degree of glossiness between the black and the colors is a cause of the gloss unevenness. In particular, the degree of glossiness of the black ink, more specifically, of the black pigment, is high. Therefore, forming a black image of black ink (below, the black ink is referred to as "mixed color black ink") in which the black is adjusted by a color pigment which has a lower degree of glossiness than the black pigment which is contained in the ink along with the black pigment, and forming a black image from a combination of color inks have been devised. In this manner, it is known that, since the black image is formed using color inks, the difference in the degree of glossiness of each color, in particular, the difference in the degree of glossiness between the black image and the color image derived from color inks, is reduced, and it is possible to improve the gloss unevenness.

Therefore, the present inventors carried out further intensive research. As a result, in addition to the above-described pattern of the black image, it was found that the above-described problem occurred (significantly) as a result of setting the degree of glossiness at 60° in each ink and the degree of glossiness at 60° in the target recording surface in the target recording medium to a variety of predetermined degrees, whereby the invention was completed. Here, it is possible to determine the above-described degree of glossiness of the ink at 60° from the degree of glossiness of the image which is recorded on the target recording medium.

That is, the invention is as follows.

[1] According to an aspect of the invention, there is provided an ink jet recording method which uses one or more types of ink which are selected from a group including (A) black ink which contains a pigment formed of one or more types of black pigment, (B) mixed color black ink which contains pigments formed of one or more types of black pigment and one or more types of color pigment, and (C) color ink which contains a pigment formed of one or more types of color pigment, in which a degree of glossiness of the ink at 60° measured based on JIS Z 8741 is increased in an order of the black ink of (A), the mixed color black ink of (B), and the color ink of (C), the degree of glossiness of a target recording surface at 60° in a target recording medium measured based on JIS Z 8741 is 40 or more, and at least one condition of the below-described (1) and (2) is satisfied.

(1) A black image is formed using at least a plurality of types of the color ink of (C) and a color image is formed using the color ink of (C).

(2) A black image is formed using the mixed color black ink of (B) and a color image is formed using the color ink of (C).

[2] In the ink jet recording method according to [1], the condition of (1) and the condition of (2) may be satisfied.

[3] In the ink jet recording method according to [1], at least the condition of (2) may be satisfied and a color pigment which is included in the mixed color black ink of (B) may include a cyan pigment.

[4] In the ink jet recording method according to [2], the color pigment which is included in the mixed color black ink of (B) may include a cyan pigment.

[5] In the ink jet recording method according to any one of [1] to [4], a ratio of a total weight of the black pigment which is included in the mixed color black ink of (B) and a total weight of the color pigments (former:latter) may be 1:1 to 1:0.2.

[6] In the ink jet recording method according to [1], [3], [4], or [5], at least the condition of (1) may be satisfied, and the black image may be formed further using at least one out of the black ink of (A) and the mixed color black ink of (B).

[7] In the ink jet recording method according to [2], the black image may be formed further using at least one out of the black ink of (A) and the mixed color black ink of (B).

[8] In the ink jet recording method according to any one of [1] to [7], a mass ratio of an amount of the black pigment and an amount of the color pigment (former:latter) may be 1:1 to 1:0.2 in an image which is formed on the target recording surface of the target recording medium using at least one out of the black ink of (A) and the mixed color black ink of (B), and the color ink of (C).

[9] According to another aspect of the invention, there is provided an ink jet recording apparatus which uses the ink jet recording method according to any of [1] to [8].

[10] According to still another aspect of the invention, there is provided a recorded matter which is recorded using the ink jet recording method according to [1] to [8] or the ink jet recording apparatus according to [9].

DESCRIPTION OF EXEMPLARY EMBODIMENTS

Below, detailed description will be given of the forms for embodying the invention. Here, the invention is not limited to the following embodiments and it is possible for the invention to be realized as various modifications within the range of the spirit thereof.

In the present specification, "(meth)acrylate" has the meaning of at least any one out of acrylate and methacrylate corresponding thereto, "(meth)acrylic" has the meaning of at least any one out of acrylic and methacrylic corresponding thereto, and "(meth)acryloyl" has the meaning of at least any one out of acryloyl and methacryloyl corresponding thereto.

In the present specification, when reference is made simply to "black ink", this typically has the meaning of black ink which includes the black ink of (A) and the mixed color black ink of (B) to be described later. In addition, in the following, black may be denoted as K, cyan as C, magenta as M, and yellow as Y.

Ink Jet Recording Method

One embodiment of the invention relates to an ink jet recording method. The above ink jet recording method forms an image by ejecting one or more types of ink selected from a group including the following (A), (B), and (C) toward a predetermined target recording medium so as to attach thereto. The ink of the above-described (A) is a black ink which contains a pigment formed of one or more types of black pigment. The ink of the above-described (B) is a mixed color black ink which contains a pigment formed of one or more types of black pigment and one or more types of color pigment. The ink of the above-described (C) is a color ink which contains a pigment formed of one or more types of color pigment.

In addition, in the above ink jet recording method, a degree of glossiness of the ink at 60° measured based on JIS Z 8741 is increased in the order of the black ink of the above-described (A), the mixed color black ink of the above-described (B), and the color ink of the above-described (C), the degree of glossiness of a target recording surface at 60° in a target recording medium measured based on JIS Z 8741 is 40 or more, and at least one condition out of the following (1) and (2) is satisfied. The condition of the above (1) is that a black image is formed using a combination of at least a plurality of types of the color ink of the above-described (C) and a color image, which is different from the above black image, is formed using the color ink of the above-described (C). The condition of the above (2) is that an image is formed using the mixed color of the above-described (B) and an image, which is different from the above image, is formed using the color ink of the above-described (C).

Here, in the present specification, "using a plurality of types of the color ink of (C)" includes not only using a plurality of types of color ink which contain pigments formed of one or more types of color pigments, but also using one type of color ink which contains pigments formed of two or more types of color pigments since it is sufficient if it is possible to form a black image as a result. Among the above, since it is possible to change the color of the image according to the usage amount of the color ink and the reproducibility is therefore excellent in images (black images) with a wide range of black tints, it is preferable that a plurality of types (a plurality of colors) of color inks which contain pigments formed of one or more types of color pigments be used.

By satisfying the conditions of at least any one out of the above-mentioned (1) or (2), it is possible to reduce the degree of glossiness of the black image and reduce the difference in the degree of glossiness (gloss unevenness) with the color image.

The present embodiment has the features of the relationship between the types of ink which are ejected from the nozzles of the printing head and the black image which is formed (first feature), the degree of glossiness of each ink at 60° (second feature), and the degree of glossiness of the target recording surface in the target recording medium at 60° (third feature).

First, description will be given of the above-described first feature. Examples of the inks which are able to be ejected from the nozzles of the print head in order to form an image include the black ink of (A), the mixed color black ink of (B) and the color ink of (C) mentioned above.

Here, the pigment which is included in the black ink of the above-described (A) is one or more types of black pigment and the black ink of (A) may be denoted as "monochrome black" in the present specification. In addition, the pigment which is included in the mixed color black ink of the above-described (B) is an ink which uses one or more types of black pigment and one or more types (one color or more) of color pigment.

Here, each of the inks of the above-described (A) to (C) substantially does not include pigments other than the described pigments. Here, in the present specification, "substantially does not include" has the meaning of not being contained in an added amount or more which is sufficient to exhibit significance and, unless otherwise noted, preferably means that, in terms of quantities, 1.0 mass % or more is not included with respect to the total mass (100 mass %) of the ink, more preferably that 0.5 mass % or more is not included, and even more preferably that 0.1 mass % or more is not included.

The color ink in the present embodiment has the meaning of a colored ink other than black ink. Examples of the colors of the color inks include yellow, magenta, cyan, green, orange, red, blue, light magenta, light cyan, and the like. Among the above, since it is possible to reproduce desired hues, one or more out of cyan, magenta, and yellow is preferable, any one out of cyan and magenta and cyan and yellow is more preferable, and cyan, magenta, and yellow are even more preferable.

Here, cases where the color inks of the above-described (C) use color inks of cyan, magenta, yellow, and the like to reproduce black may be denoted as "composite black" in the present specification. Here, the above composite black may combine the color ink of (C) and the (mixed color) black ink of (A) or (B).

The above-described first feature is that at least any one out of the above-described conditions of (1) and (2) is satisfied. When speaking of the relationship between the types of ink and the formed black image, it is possible to say the following of the conditions of (1) and (2) described above.

(1) One black image is formed (composite black mode) using inks for which at least a plurality of types of color inks of (C) are provided and a color image which is different to the above black image using the color inks of (C) is formed.

(2) One or more black images are formed using the mixed color black ink of (B) and one or more color images which are different to the above black image are formed using the color inks of (C).

Out of the above-described (A), (B), and (C), examples of the image pattern which is formed by combining the inks in the present embodiment include the following (I) to (IV).

(I) One black image is formed by combining a plurality of types of the color inks of the above-described (C) and one or more color images which are different to the above black image are formed using the color inks of (C).

(II) One black image is formed by combining the mixed color black ink of the above-described (B) and the color inks of the above-described (C) and one or more color images which are different to the above black image are formed using the color inks of (C).

(III) One black image is formed by combining the black ink of the above-described (A) and the color inks of the above-described (C) and one or more color images which are different to the above black image are formed using the color inks of (C).

(IV) One black image is formed by combining the black ink of the above-described (A), the mixed color black ink of the above-described (B), and the color inks of the above-described (C) and one or more color images which are different to the above black image are formed using the color inks of (C).

The above-described (I) conforms to the conditions of the above-described (1). The above-described (II) to (IV) conform to the conditions of the above-described (1) and further use at least any one out of the black ink of the above-described (A) or the mixed color black ink of the above-described (B). In addition, the above-described (I) to (IV) have a composite black mode.

(V) One or more black images are formed from the mixed color black ink of the above-described (B) and one or more color images are formed from the color inks of the above-described (C). The above black image and the above color image may be in contact at their respective edge portions.

The above-described (V) conforms to the conditions of the above-described (2).

Even in (I) to (IV), since the reproducibility of the black image is excellent, (II) or (III) in which the black ink of (A) or the mixed color black ink of (B) are combined is preferable, and, since it is possible to effectively prevent the generation of gloss unevenness, (II) which uses the mixed color black ink of the above-described (B) and the color ink of the above-described (C) is more preferable.

Among the above, further description will be given of the above-described (II), (IV), and (V). In order to make the tint of the black more favorable, the mixed color black ink of (B) preferably contains at least the cyan pigment, more preferably contains at least the cyan pigment and the magenta pigment, and even more preferably contains at least the cyan pigment and the magenta pigment and substantially does not contain the yellow pigment. In this manner, it is possible to bring the mixed color black ink even closer to an achromatic black ink. Here, in terms of quantities, "substantially does not contain" means that the content with respect to the total mass (100 mass %) of the ink is preferably 0.01 mass % or less and more preferably 0.005 mass % or less.

In addition, further description will be given of the condition of the above-described (1). The condition of the above (1) is to have a composite black mode. In this manner, in a case where an image is formed using the color ink of the above-described (C) and a composite black image is formed using a plurality of types of the color ink of the above-described (C), it is possible to reduce the gloss unevenness between both images.

The above-described first feature preferably satisfies the conditions of the above-described (1) and (2) together. There are cases where the gradation recording of the black image is performed by forming an image using composite black in a region where the image density is low (grey region) and using black ink or mixed color black ink alone in a region where the image density is high. In such a case, if the black ink is the mixed color black ink of the above-described (B), since the gloss unevenness of the black ink is reduced, it is possible to suppress the gloss unevenness between the black images in a case where gradation recording is performed.

In a case where the conditions of the above-mentioned (1) and (2) are satisfied together, preferably, at least the mixed color black ink of the above-described (B) and the color ink of the above-described (C) are provided, a black image is formed using the mixed color black ink of the above-described (B), and a composite black image which is different to the above-described black image is formed using the black ink of the above-described (A) or the mixed color black ink of (B) with the color ink of the above-described (C). In this manner, the reproducibility of the black image is more favorable.

In addition, in the above-mentioned case, the color pigment which is included in the mixed color black ink of (B) is preferably at least the cyan pigment, more preferably at least the cyan pigment and the magenta pigment, and even more preferably at least the cyan pigment and the magenta pigment while substantially not including the yellow pigment. In this manner, it is possible to bring the mixed color black ink of (B) even closer to an achromatic black ink.

In the mixed color black ink of the above-described (B), the ratio of the total mass of the black pigment and the total mass of the color pigment (former:latter) is preferably 1:1 to 1:0.2 and more preferably 1:1 to 1:0.4. If the above ratio is within the above-described range, it is possible to more effectively prevent the generation of the gloss unevenness.

Here, the respective inks in the present embodiment may be provided as two or more types of any of the above-described (A), (B), and (C) or may be further provided as other inks instead of as a combination of the preferable inks which are exemplified in the above description. As such other inks, it is possible to use commonly known inks in a range which does not impair the object of the invention.

In addition, as the above-described second feature, the degree of glossiness of the ink at 60° on the recording medium measured based on JIS Z 8741 is higher in the order of the black ink of the above-described (A), the mixed color black ink of the above-described (B), and the color ink of the above-described (C). Below, description will be given of the degree of glossiness of the above inks. Here, in a case where only one out of the black ink of the above-described (A) and the mixed color black ink of (B) is provided, the degree of glossiness of the black ink which is provided is preferably higher than the degree of glossiness of the color ink of the above-described (C).

When the additives and dispersing agents are the same, the degree of glossiness of the inks changes according to the pigment type and the average particle diameter. Black pigments such as carbon black are shifted to a yellow system (that is, in the color space $L^*a^*b^*$, the b* value has a positive value), and the tint of a blue system is weak. Therefore, it may be desirable that the black ink (for example, the black ink of the above-described (A)) which contains a black pigment as the pigment have the tint of the blue system strengthened.

Therefore, it is preferable that the color pigment which is included in the mixed color black ink of the above-described (B) include at least the cyan pigment, or that at least the cyan ink be used as the color ink of the above-described (C) along with the black ink of the above-described (A) when recording the image of the composite black. In this manner, the tint of the blue system of the black ink is strengthened to a certain extent and it is possible to move closer to the desired hue.

Here, in the above-described preferable cases, it is preferable that at least the condition of the above-mentioned (2) be satisfied, or that the conditions of (1) and (2) be satisfied together.

In order to sufficiently strengthen the hue of the blue system of the above-described black ink and set the strict black which is the desired hue, it is preferable either that the color pigment which is included in the mixed color black ink of the above-described (B) include at least the cyan pigment and the magenta pigment, or that at least the cyan ink and magenta ink be used as the color inks of the above-described (C) along with the black ink of the above-described (A) when recording the image of the composite black. In this manner, it is possible to bring the black ink even closer to achromatic. Furthermore, in the mixed color black ink of the above-described (B), it is preferable that the color pigment include at least the cyan pigment and the magenta pigment and that the yellow pigment is substantially not included.

The preferable form of the mixed color black ink of (B) is as described above; however, in order to adjust the balance of the black to form a favorable black image when the composite black image is recorded, it is preferable that at least three colors which include yellow ink as well as cyan ink and magenta ink be used.

In addition, regardless of the type of the color pigments, if a pigment of which the degree of glossiness is low is added, there is a tendency for the gloss unevenness to be improved. Here, in a case where a resin of which the average particle diameter (below, simply referred to as "average particle diameter") on a volumetric basis is great is added to the ink, it is difficult to densely arrange the pigment which is included in the ink on the recording medium and there is a tendency for the degree of glossiness to decrease. As such, it is preferable that a resin which has an average particle diameter which is greater than the average particle diameter of the pigment be added to the black ink of the above-described (A) or the mixed color black ink of (B).

Here, it is possible for the "degree of glossiness of the ink at 60° on the recording medium measured based on JIS Z 8741" in the present specification to be measured with the method which is used in the embodiments to be described later.

Below, description will be given of additives (components) which are included, or which are able to be included, in each ink in the present embodiment. Here, each component which is contained in each ink of the above-described (A), (B), and (C) is selected independently of each other in terms of the type, the properties thereof, the content, and the like. In addition, even in a case where a plurality of types of the inks of any out of the above-described (A), (B), and (C) are present, in the same manner as described above, the type of each component which is included in the respective inks, the properties thereof, the content, and the like are selected independently of each other. Furthermore, the type of the black pigment may be the same in each ink of the above-described (A) and (B) or may be very different, but it is preferably the same throughout. In addition, the type of the color pigment may be the same in each ink of the above-described (B) and (C) or may be very different, but it is preferably the same throughout.

Pigment

The pigment which is contained in the ink in the present embodiment has properties not only of being insoluble or sparingly soluble in water, but also of not easily fading due to water, gas, or the like. Therefore, the recorded matter which is recorded by the ink which uses the pigment is excellent in water resistance, gas resistance, and light resistance without generating gloss unevenness, and also has favorable storage stability.

First, examples of the black pigment which is included in the mixed color black ink of the above-described (A) and (B) include carbon black or the like.

The above-described carbon black is not particularly limited; however, examples thereof include furnace black, lamp black, acetylene black, and channel black (C. I. Pigment Black 7). In addition, examples of commercially available products of carbon black include No. 2300, 900, MCF88, No. 20B, No. 33, No. 40, No. 45, No. 52, MA7, MA8, MA100, No. 2200B (the above are all product names, manufactured by Mitsubishi Chemical Corporation), Color Black FW1, FW2, FW2V, FW18, FW200, 5150, 5160, 5170, Pre-Tex 35, U, V, 140U, Special Black 6, 5, 4A, 4, 250 (the above are all product names, manufactured by Degussa AG), Conductex SC, Loewen 1255, 5750, 5250, 5000, 3500, 1255, 700 (the above are all product names, manufactured by Columbia Carbon Japan, Ltd.), Regal 400R, 330R, 660R, Mogul L, Monarch 700, 800, 880, 900, 1000, 1100, 1300, 1400, Elf Tex (the above are all product names, manufactured by Cabot Corporation), or the like.

It is possible to select the above-described carbon black for the mixed color black inks of the above-described (A) and (B) independently of each other.

The carbon black which is respectively included in the mixed color black ink of the above-described (A) and (B) may be used as one single type or used as a combination of two or more types.

Since it is possible to appropriately set the content of the above-described carbon black in order to obtain the desired color development, 0.1 to 5 mass % with respect to the total mass (100 mass %) of the black ink of the above-described (A) is preferable.

In addition, the color pigment which is included in the mixed color black ink of the above-described (B) and the color ink of the above-described (C) is not limited to the following; however, examples thereof include quinacridone based pigments, quinacridone quinone based pigments, dioxazine based pigments, phthalocyanine based pigments, anthrapyrimidine based pigments, anthanthrone based pigments, indanthrone based pigment, flavanthrone based pigments, perylene based pigments, diketopyrrolopyrrole based pigments, perinone based pigments, quinophthalone based pigments, anthraquinone based pigments, thioindigo based pigments, benzimidazolone based pigments, isoindolinone based pigments, azomethine based pigments, and azo based pigments (disazo based, monoazo based, and the like). Specific examples of color pigments include the following.

Examples of the pigment (cyan pigment) which is used in the cyan ink include C. I. Pigment Blue 1, 2, 3, 15, 15:1, 15:2, 15:3, 15:4, 15:6, 15:34, 16, 18, 22, 60, 65, 66, C. I. Vat Blue 4, and 60. Among the above, at least one out of C. I. Pigment Blue 15:3 and 15:4 is preferable.

Examples of the pigment (magenta pigment) which is used in the magenta ink include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, 264, C. I. Pigment Violet 19, 23, 32, 33, 36, 38, 43, and 50. Among the above, one or more types which are selected from a group including C. I. Pigment Red 122, C. I. Pigment Red 202, and C. I. Pigment Violet 19 are preferable, and C. I. Pigment Red 122 is more preferable.

Examples of the pigment (yellow pigment) which is used in the yellow ink include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213. Among the above, one or more types which are selected from a group including C. I. Pigment Yellow 74, 155, and 213 are preferable and C. I. Pigment Yellow 155 is more preferable.

Here, examples of the pigments which are used in green ink, orange ink, and the like, as well as inks of colors other than those described above, include commonly known pigments.

Among the above, the color pigment which is included in the mixed color black ink of the above-described (B) and the color pigment which is included in the color ink of the above-described (C) are independent of each other, and preferably include one or more types of pigment which are selected from a group including the cyan pigment, the magenta pigment, and the yellow pigment. In such a case, as described above, the tint of the blue system of the black ink is sufficiently strengthened and it is possible to move closer to the desired tint. Among the above, to obtain the desired tint and for ease of use as ink jet ink, a phthalocyanine pigment is preferable as the cyan pigment, a quinacridone pigment is preferable as the magenta pigment and an azo based pigment is preferable as the yellow pigment.

In particular, in a case where the black pigment and the color pigment are included as the pigment in the mixed color black ink of the above-described (B), the total content of these pigments is preferably 0.5 to 5 mass % with respect to the total mass (100 mass %) of the above ink. If the above total content is within the above-described range, the desired color development is obtained and the stability of the ink is excellent. In addition, in the above-described case, the mass ratio of the content of the black pigment and the content of the color pigment (former:latter) is preferably 1:1 to 1:0.2. Due to this, it is possible to further reduce the gloss unevenness between images. Furthermore, in the above-described case, the mass ratio of the content of the color pigment (former:latter) is preferably 1:1 to 1:0.1. If the above mass ratio is within the above-described range, it is possible to bring the tint of the black ink to a favorable black (strict black). Here, the above-mentioned color pigment is preferably at least the cyan pigment and more preferably the cyan pigment and the magenta pigment.

As described above, the carbon black and the color pigments, which are inorganic pigments, all have a good color development property and exhibit an advantageous effect in that settling does not occur easily during dispersion due to the specific gravities being low.

In addition, in order to suppress clogging of the nozzles and to obtain more favorable ejection stability, the average particle diameter of the above-described carbon black or color pigments is preferably 250 nm or less and more preferably 50 to 200 nm.

Here, the average particle diameter in the present specification is on a volumetric basis. As the measurement method, for example, it is possible to perform measurement using a particle size distribution measuring apparatus using the laser diffraction scattering method as the measurement principle. Examples of the particle size distribution measuring apparatus include particle size distribution meters (for example, Microtrac UPA manufactured by Nikkiso Co., Ltd.) using the dynamic light scattering method as the measurement principle.

Resin

The ink in the present embodiment may contain a resin, preferably a resin which has a binding capability (below referred to as a "binder resin"). The above binder resin exhibits an effect of sufficiently fixing the ink onto the target recording medium and making the abrasion resistance of the recorded matter favorable by forming a resin coating when the target recording medium is heated in the ink jet recording. Therefore, the binder resin is preferably a thermoplastic resin. The recorded matter which is recorded using ink which contains the binder resin using the above-described effect has superior abrasion resistance on a target recording medium which is non-absorbent or which has low absorption of ink.

In addition, the binder resin is contained in an emulsion state in the ink. By the binder resin being contained in the ink in the emulsion state, it is possible to easily adjust the viscosity of the ink to an appropriate range in the ink jet recording method and the storage stability and ejection stability of the ink are excellent.

The binder resin is not particularly limited; however, examples thereof include (meth)acrylate, (meth)acrylate ester, acrylonitrile, cyanoacrylate, acrylamide, olefin, styrene, vinyl acetate, vinyl chloride, vinyl alcohol, vinyl ether, vinylpyrrolidone, vinylpyridine, vinylcarbazole, vinylimidazole, a homopolymer or copolymers of vinylidene chloride, fluorine resin, and natural resins. Among the above, at least one of a (meth)acrylate based resin and a styrene (meth) acrylate copolymer based resin is preferable, at least one of an acrylate based resin and a styrene acrylate copolymer based resin is more preferable, and the styrene acrylate copolymer based resin is even more preferable. Here, the above-described copolymers may have a form of any one out of a random copolymer, a block copolymer, an alternating copolymer, and a graft copolymer.

As the above-described binder resin, ones which are obtained using known materials and manufacturing methods may be used, and commercial products may be used. The commercial products are not particularly limited; however, examples thereof include Microgel E-1002, Microgel E-5002 (the above are product names, manufactured by Nippon Paint Co. Ltd.), Voncoat 4001, Voncoat 5454 (the above are product names, manufactured by DIC Corporation), SAE1014 (product name, manufactured by Zeon Corporation), Saivinol SK-200 (product name, manufactured by Saiden Chemical Industry Co., Ltd.), Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, Joncryl 7610 (the above are product names, manufactured by BASF Japan Ltd.), and the like.

The above-described binder resin is not particularly limited; however, it is possible to obtain the binder resin using a preparation method which is shown below, or a combination of a plurality of methods according to necessity. Examples of the above preparation method include a method of mixing (emulsion polymerization) a polymerization catalyst (polymerization initiator) and a dispersing agent into monomers of components which configure the desired resins, a method of dissolving a resin which has a hydrophilic moiety into a water-soluble organic solvent, mixing the obtained solution into water, and removing the water-soluble organic solvent by distillation or the like, and a method of dissolving a resin into a water-insoluble organic solvent and mixing the obtained solution along with a dispersing agent into an aqueous solution.

The dispersing agent which is able to be used when the binder resin is dispersed in the emulsion state is not particularly limited; however, examples thereof include anionic surfactants such as sodium dodecylbenzenesulfonates, sodium lauryl phosphate and ammonium polyoxyethylene alkyl ether sulfates, and non-ionic surfactants such as polyoxyethylene alkyl ethers, polyoxyethylene alkyl esters, polyoxyethylene sorbitan fatty acid esters, and polyoxyethylene alkyl phenyl ethers. The above dispersing agents may be used as one single type or used as a combination of two or more types.

The average particle diameter of the binder resin is preferably 5 nm to 400 nm and more preferably 20 nm to 300 nm, in order to obtain more favorable storage stability and ejection stability of the ink.

The glass transition temperature (Tg) of the binder resin is preferably 40° C. or more, more preferably 40 to 150° C., and even more preferably 60 to 150° C. in order to obtain a favorable fixing property of the ink and favorable abrasion resistance of the image.

Here, it is possible to determine Tg in the present specification from a DSC curve based on JIS K 7121.

The content of the binder resin which is able to be included in each ink (in terms of solid content) is preferably 0.5 to 5 mass % and more preferably 0.5 to 1.5 mass % with respect to the total mass of the ink (100 mass %). When the content is within the above-described range, the abrasion resistance is superior.

Surfactant

The ink in the present embodiment may include a surfactant. Examples of the above surfactants include anionic surfactants and non-ionic surfactants.

The above-described anionic surfactants are not particularly limited; however, examples thereof include higher fatty acid salts, higher alkyl dicarboxylic acid salts, higher alcohol sulfate ester salts, higher alkyl sulfonate salts, alkyl benzene sulfonate salts, alkyl naphthalene sulfonate salts, salts of naphthalene sulfonate (for example, salts of sodium, potassium, lithium, and calcium), formalin polycondensates, condensates of higher fatty acids and amino acids, dialkyl sulfosuccinate ester salts, alkyl sulfosuccinate salts, naphthenate salts, alkyl ether carboxylic acid salts, acylated peptide, α-olefin sulfonic acid salts, N-acyl methyl taurine, alkyl ether sulfate salts, secondary higher alcohol ethoxy sulfates, monoglycidyl sulfates, alkyl ether phosphoric acid ester salts, alkyl phosphate ester salts, polyoxyethylene alkyl ether sulfuric acid ammonium salts, polyoxyethylene alkyl ether sulfuric acid sodium salts, polyoxyethylene alkyl phenyl ether sulfuric acid ammonium salts, polyoxyethylene alkyl phenyl ether sulfuric acid sodium salts, polyoxyethylene alkyl sulfuric acid monoethanolamine, polyoxyethylene alkyl ether phosphoric acid ammonium salts, polyoxyethylene alkyl ether phosphoric acid potassium salts, polyoxyethylene alkyl ether phosphoric acid diethanolamine, alkyl naphthalene sulfonate sodium, and sodium lauryl sulfate.

The above-described non-ionic surfactant is not particularly limited; however, examples thereof include silicon based, acetylene glycol based, ethylene oxide adducts of acetylene glycol (acetylene glycol alcohol ethylene oxide), fluorine based, polyoxyethylene alkyl ether based, polyoxypropylene alkyl ether based, polycyclic phenyl ether based, sorbitan derivatives, and propyl ethanol amide. In a case where the ink jet recording is performed using ink which includes the non-ionic based surfactant, it is possible to obtain a high-definition image with almost no gloss unevenness or bleeding.

In the above-described non-ionic surfactants, the silicon based surfactants are preferable, and, among the silicon based surfactants, polysiloxane based compounds may be preferably exemplified. The above polysiloxane based compounds are not particularly limited; however, examples thereof include polyether-modified organosiloxane. Examples of commercially available polyether-modified organosiloxane BYK-306, BYK-307, BYK-333, BYK-341, BYK-345, BYK-346, BYK-348 (the above are product names, manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are product names, manufactured by Shin-Etsu Chemical Co., Ltd.).

The above-described surfactants may be used as one single type or used as a mixture of two or more types.

It is sufficient if the content of the above-described surfactants is in a range of 0.1 to 3 mass % with respect to the total mass (100 mass %) of the ink in order to make the storage stability and the ejection stability of the ink more favorable.

Moisturizing Agent (Wetting Agent)

The ink in the present embodiment may include a moisturizing agent (wetting agent). As the above moisturizing agent, it is possible to use those which are generally used in ink without particular limitation. A high-boiling point moisturizing agent of which the boiling point is preferably 180° C. or more and more preferably 200° C. or more is used. In a case where the boiling point is within the above-described range, it is possible to impart a water retaining property and a wetting property to the ink.

The high-boiling point moisturizing agent is not limited to the following; however, examples include ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycol having a number average molecular weight of 2,000 or less, 1,3-propylene glycol, isopropylene glycol, iso-butylene glycol, glycerin, meso-erythritol, and pentaerythritol.

By adding a high-boiling moisturizing agent to the ink, it is possible to obtain an ink for ink jet recording which is able to maintain fluidity and re-dispersibility for a long time even when left in an opened state, that is, a state where the ink is exposed to air at room temperature. Furthermore, since such inks do not easily cause clogging of the nozzles when re-starting during printing or after printing interruption using the ink jet printer, it is possible to obtain an ink which has excellent ejection stability from the nozzles.

The above-described moisturizing agent may be used as one single type or used as a mixture of two or more types.

It is sufficient if the content of the above-described moisturizing agent is 1 to 15 mass % with respect to the total mass (100 mass %) of the ink.

Water

The ink in the present embodiment may contain water. In particular, in a case where the above ink is an aqueous ink, the water is a medium of which the ink is the main part and is a component which is evaporated and dispersed when the target recording medium is heated in the ink jet recording.

Examples of the water include ion-exchanged water, ultra-filtrated water, reverse osmosis water, and water in which ionic impurities are removed as much as possible such as pure water and ultra-pure water such as distilled water. In addition, when water sterilized by ultraviolet irradiation, the addition of hydrogen peroxide, or the like is used, it is possible to prevent the generation of mold and bacteria in a case where the pigment dispersion liquid and an ink which uses the pigment dispersion liquid is stored for a long period.

Here, the water content is not particularly limited and may be determined appropriately according to necessity; however, for example, 20 to 95 mass % is sufficient.

Organic Solvent

It is preferable that the ink in the present embodiment further include an organic solvent as the solvent and, among these, preferably further includes a water-soluble organic solvent which has volatility. As the above solvent, a mixed solvent of the above-described pure water and a water-soluble organic solvent is preferable.

The above-described water-soluble organic solvent is not particularly limited; however, examples thereof include dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, dipropylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, alcohols or glycols such as tert-pentanol, N,N-dimethylformamide, N,N-dimethylacetamide, 2-pyrrolidone, N-methyl-2-pyrrolidone, 2-oxazolidone, 1,3-dimethyl-2-imidazolidinone, dimethyl sulfoxide, sulfolane, and 1,1,3,3-tetramethylurea.

The above-described water-soluble organic solvent may be used as one single type or used as a combination of two or more types.

The content of the above-described water-soluble organic solvent is not particularly limited and may be determined appropriately according to necessity; however, for example, 1 to 50 mass % may be sufficient.

Other Components

The ink in the present embodiment may further include a pH adjusting agent, preservatives or fungicides, a rust inhibitor, a chelating agent, or the like in addition to the above-described components.

Manufacturing Method of Ink

It is possible to obtain the ink in the present embodiment by mixing the above-mentioned components (materials) in an arbitrary order, performing filtering or the like according to necessity, and removing impurities. Here, mixing the pigments after preparation in a state of being uniformly dispersed in the solvent in advance is preferable since the handling is simple.

As the mixing method of each material, a method of sequentially adding material into a container which is provided with a stirring apparatus such as a mechanical stirrer or a magnetic stirrer and performing stirring and mixing may be favorably used. As a filtering method, for example, it is possible to perform centrifugal filtering, filtering with a filter, or the like according to necessity.

Target Recording Medium

The ink jet recording method of the present embodiment ejects and attaches a combination of inks which are described above in the above description onto the target recording medium to form an image. As the above target recording medium, a target recording medium which is non-absorbent or which has low absorption of ink is preferable.

In the present specification, the "target recording medium which is non-absorbent or which has low absorption of ink" indicates a "target recording medium where the water absorption amount is $10\ mL/m^2$ or less up to 30 msec$^{1/2}$ from the start of contact using the Bristow method". The Bristow method is the most widely used method for measuring the liquid absorption amount in a short period of time and is also adopted by the Japan Technical Association of the Pulp and Paper Industry (JAPAN TAPPI). The details of the test method are described in the Standard No. 51 "Paper and Paperboard Liquid absorption Test Method—Bristow Method" of the "JAPAN TAPPI Paper and Pulp Test Methods 2000 Edition".

As the above-described third feature, the degree of glossiness at 60° of the target recording surface in the above-described predetermined target recording medium measured based on JIS Z 8741 is 40 or more, preferably 40 to 110, and more preferably 50 to 110. If the degree of glossiness of the target recording surface at 60° is within the above-described range, it is possible for the present embodiment to have a remarkably large effect since the problems to be solved by the invention are remarkably generated. Although the details are not clear, this is assumed to be as follows. In a case where ink which includes the pigments is recorded on photographic paper or the like, the ink penetrates quickly while the pigment remains on the target recording surface. On the other hand, in a case where the ink which includes the pigment is recorded on a target recording medium which does not absorb ink, the ink is left on the target recording surface for a long period. It is assumed that in a case where recording is performed on photographic paper or the like, gloss difference between the images does not easily occur due to the differences in the absorption of ink in such a target recording medium, while in a case where recording is performed on a target recording medium which does not absorb ink, gloss difference between the images easily occurs due to the influence of the pigment characteristics, the resin, and the solvent composition. Thus, it is assumed that the differences due to the gloss difference are remarkably recognizable in a case where the target recording medium has a high degree of glossiness. Here, the above assumptions do not limit the range of the invention at all.

Here, it is possible to measure "the degree of glossiness at 60° of the target recording surface in the above-described predetermined target recording medium measured based on JIS Z 8741" with methods executed in the Example to be described below.

The target recording medium which does not absorb ink is not limited to the following; however, examples thereof include a plastic film which does not undergo surface treatment for ink jet recording (that is, where an ink absorbing layer is not formed), a medium where plastic is coated on a substrate such as paper, and a medium to which a plastic film is adhered. The above plastic is not particularly limited; however, examples thereof include polyvinyl chloride, polyethylene terephthalate, polycarbonate, polystyrene, polyurethane, polyethylene, and polypropylene. The target recording medium which has low absorption of ink is not particularly limited; however, examples thereof include printing paper such as art paper, coated paper, matt paper, and the like.

Below, detailed description will be given for each step of an example of the ink jet recording method of the present embodiment.

Ejection Step

The ink jet recording method of the present embodiment includes an ejection step. The above ejection step ejects liquid droplets of ink onto the above-mentioned target recording medium with an ink jet recording method and forms an image. As the ejection method, it is possible to use a commonly known method, and, among these, it is possible to perform excellent recording when a method which ejects liquid droplets using the vibration of a piezoelectric element (a recording method which uses a head which forms ink droplets by the mechanical deformation of an electrostrictive element) is used.

Drying Step

The recording method of the present embodiment may include a drying step. The above drying step dries ink (an image) which is ejected and attached to the target recording medium. By this step, moisture and the like which is included in the ink which is ejected onto the target recording medium is quickly evaporated and dispersed, and a layer of ink, that is, an image, is formed. In this manner, on the target recording medium, it is possible to obtain a high-quality image in which the dried ink is strongly fixed and in which it is possible to more effectively prevent the gloss unevenness, in a short time.

Here, the drying step may be performed in parallel with the ejection step or performed after the ejection step. In other words, it is sufficient if the target recording medium is heated in at least any one out of before the recording, during the recording, and after completion of the recording. Among the above, it may be said that heating the target recording medium before the recording or during the recording is preferable since it is possible to form a high-quality image with little gloss unevenness on the target recording medium which is non-absorbent or which has low absorption of ink.

The method of the above-described heating is not particularly limited; however, examples thereof include a heater which is provided in the ink jet recording apparatus, a warm air mechanism provided in the ink jet recording apparatus, and means which uses a drying mechanism such as a thermostat which is connected to the ink jet recording apparatus. Then, it is possible to use one type alone or two or more types in combination.

In the above-described drying step, the temperature of the target recording surface (upper surface) of the target recording medium which contacts the ink depends on the material of the recording medium, but is preferably 40 to 120° C. When the above temperature is 40° C. or more, it is possible to effectively promote the evaporation and dispersing of the liquid medium in the ink. On the other hand, when the above temperature is 120° C. or less, it is possible to prevent the deformation of the target recording medium or to prevent the shrinking or the like of the image when the target recording medium is heated and cooled.

In this manner, according to the present embodiment, it is possible to provide an ink jet recording method which is able to effectively prevent the generation of gloss unevenness in the boundary portions of the black regions and the color regions.

Ink Jet Recording Apparatus

An embodiment of the invention relates to an ink jet recording apparatus. The above ink jet recording apparatus uses the ink jet recording method of the above-described embodiment.

Recording Material

The recording material according to one embodiment of the invention is obtained by using the ink jet recording method of the above-described embodiment or the ink jet recording apparatus of the above-described embodiment. The recorded matter has excellent image quality in which gloss unevenness is not observed. Here, the gloss difference at 60° between the color image and the black image is preferably less than 50, more preferably less than 30.

In an image which is formed on the target recording surface of the above-described recording material (the target recording medium) using at least one out of the black ink of the above-described (A) and the mixed color black ink of the above-described (B), and the color ink of the above-described (C), the mass ratio of the amounts of the black pigment and the color pigments (former:latter) is preferably 1:0.1 to 0.1:1, and more preferably 1:1 to 1:0.2. When the above mass ratio is within the above-described range, it is possible to further reduce the gloss unevenness without remarkably impairing the tint of the black image. Here, in a case where the color pigment is also included in the black ink, color pigments derived from the above-described black ink are also included.

EXAMPLES

Below, detailed description will be given of the invention using Examples; however, the invention is not limited thereto.

Used Materials

The materials which are used in the following Examples and Comparative Examples are as follows.

Pigment
    C. I. Pigment Black 7 (average particle diameter 80 nm, below abbreviated as "PBk7")
    C. I. Pigment Blue 15:3 (average particle diameter 100 nm, below abbreviated as "PB15:3")
    C. I. Pigment Red 122 (average particle diameter 120 nm, below abbreviated as "PR122")
    C. I. Pigment Yellow 155 (average particle diameter 200 nm, below abbreviated as "PY155")

Resin
    Styrene acrylic acid polymer (Tg 85° C., average particle diameter 140 nm, below abbreviated as "St/AA") Surfactant
    BYK348 (silicon based surfactant, product name, manufactured by BYK)

Moisturizing Agent
    Propylene glycol (below, abbreviated as "PG")

Organic Solvent
    1,2-hexanediol (below, abbreviated as "1,2-HD")
    2-pyrrolidone (below, abbreviated as "2-Py")

Water
    Pure water

Target Recording Medium
    Target recording medium 1 (IJ40-10R (manufactured by Sumitomo 3M Ltd.) degree of glossiness 39 of the target recording surface at 60°)
    Target recording medium 2 (photographic paper (gloss) (KA4100PSKR) [product name], manufactured by Seiko Epson Corporation, degree of glossiness 86 of the target recording surface at 60°)

Here, the degree of glossiness of the target recording surface in each target recording medium at 60° was measured based on JIS Z 8741:1997 (Title: Specular Degree Of Glossiness Measurement Method", Standard Summary: Provisions regarding the method of measuring the specular degree of glossiness of smooth surfaces of industrial products viewed macroscopically, Corresponding International Standards:

ISO 2813: 1994, ISO 7668:1986) in the same manner as the measurement of the degree of glossiness of the ink at 60° to be described later. Here, the degree of glossiness described above is the average value after measurement was performed 5 times.

Preparation of Ink

With the compositions shown in the following Table 1, black inks 1 to 3, cyan ink (C), magenta ink (M), and yellow ink (Y) were prepared. Each ink is prepared by removing impurities such as dust and coarse particles by filtering with a membrane filter with a hole diameter 5 μm after putting each component into a container and stirring and mixing for two hours with a magnetic stirrer. Here, the units of the figures in Table 1 are in mass %.

Measurement of Degree of Glossiness of Ink at 60°

The degree of glossiness of the inks at 60° was measured using a GlossMeter VGP5000 (product name, manufactured by Nippon Denshoku Industries Co. Ltd.) gloss meter based on Japanese Industrial Standards (JIS) Z 8741: 1997 (Title "Specular Degree Of Glossiness Measurement Method", Corresponding International Standard: ISO 2813: 1994 (MOD)). The results are shown in Table 1 below.

Here, the black inks 1 and 2 correspond to the mixed color black ink of the above-mentioned (B), and the black ink 3 corresponds to the black ink of the above-mentioned (A).

mercially available target recording medium with a resolution of 720×1440 dpi, a dot weight of 1 dot being 14 ng, and at 13 mg/inch$^2$.

For the Examples 1 to 5, 8 and Comparative Example 2, the black ink described in Table 2 and a predetermined color ink ("the color ink which is used in the CB image" described in Table 2) were combined to form a composite black image and a cyan image was solidly printed using the cyan ink. For Example 6, a composite black image, which used only predetermined color inks described in Table 2, and a cyan image, which used cyan ink, were solidly printed. The Example 7 and the Comparative Example 1 form an image using only black ink and form a cyan image using the cyan ink. Each of the obtained recording materials was dried for ten minutes at 80° C.

Measurement of Content Ratio of Black Pigment and Color Pigment

In the target recording surface of the target recording medium, when the content of the black pigment was set to 1, the ratio of the content of the color pigment was determined. Specifically, the content on the target recording medium was calculated from the amount of ink which was applied and the amount of the pigment which was included in the above ink, in the recorded matters which were obtained in each of the

TABLE 1

|  |  | Ink type | | | | | |
|  |  | Black Ink | | | Color Ink | | |
| Component Name | | 1 | 2 | 3 | Cyan (C) | Magenta (M) | Yellow (Y) |
| --- | --- | --- | --- | --- | --- | --- | --- |
| Pigment | PBk 7 | 3 | 2.5 | 4 | — | — | — |
|  | PB 15:3 | 1 | 1 | — | 4 | — | — |
|  | PR 122 | — | 0.5 | — | — | 4 | — |
|  | PY 155 | — | — | — | — | — | 4 |
| Organic solvent | 1,2-HD | 5 | 5 | 5 | 5 | 5 | 5 |
|  | 2-Py | 15.0 | 15.0 | 15.0 | 15.0 | 15.0 | 15.0 |
| Resin | St/AA | 1.0 | 1.0 | 1.0 | 1.0 | 1.0 | 1.0 |
| Surfactant | BYK348 | 0.5 | 0.5 | 0.5 | 0.5 | 0.5 | 0.5 |
| Moisturizing agent | PG | 10.0 | 10.0 | 10.0 | 10.0 | 10.0 | 10.0 |
| Water | Pure water | Remainder | Remainder | Remainder | Remainder | Remainder | Remainder |
| Degree of glossiness of ink at 60° | | 108 | 103 | 115 | 72 | 94 | 66 |

From the above-described Table 1, it was found that the degree of glossiness of the ink at 60° is a high value in the order of the black ink 3, then the black inks 1 and 2, then each of the color inks of C, M, and Y. The application conditions (ejection conditions) and the application amounts (ejection amounts) to the target recording medium are all the same.

Examples 1 to 6, Comparative Examples 1 and 2

For the Examples 1 to 6 and Comparative Example 2, the inks shown in the following Table 2 are combined.

A printer PX-H6000 (product name, manufactured by Seiko Epson Corporation) was used. Each of the above-described adjusted inks was filled into the printer, and image forming was performed as follows with respect to the com- Examples and each of the Comparative Examples. Here, for Examples 6 and 7 and Comparative Example 1, the calculation of the content ratio of the pigment in the composite black image is not performed.

Here, the results of the calculation are described in the item "content ratio of color pigments with respect to content 1 of K pigment" in Table 2 below.

Evaluation of Gloss Unevenness

The evaluation criteria are as follows. The evaluation results are shown in Table 2 below.

○: A difference in the degree of glossiness between the black image region and the color image region is almost unnoticeable.

Δ: A difference in the degree of glossiness between the black image region and the color image region is a little noticeable.

x: A difference in the degree of glossiness between the black image region and the color image region is extremely noticeable.

TABLE 2

| | Examples Comparative Examples | | | | | | | | | |
|---|---|---|---|---|---|---|---|---|---|---|
| | Example No. | | | | | | | | Comparative Example No. | |
| Item | 1 | 2 | 3 | 4 | 5 | 6 | 7 | 8 | 1 | 2 |
| (Mixed color) black ink No. | 1 | 2 | 1 | 1 | 1 | — | 1 | 3 | 3 | 1 |
| Type of color ink used in composite black image | C, M, Y | C, M, Y | C, M | C, Y | C, M, Y | C, M, Y | — | C, M, Y | — | C, M, Y |
| Content ratio of color pigment with respect to content 1 of K pigment | 0.5 | 0.5 | 0.5 | 0.5 | 0.2 | — | — | 0.3 | — | 0.4 |
| Target recording medium No. | 1 | 1 | 1 | 1 | 1 | 1 | 1 | 1 | 1 | 2 |
| Gloss unevenness evaluation | ○ | ○ | ○ | ○ | Δ | ○ | Δ | Δ | X | — |

From the above-described Table 2, it is understood that the degree of glossiness of the ink at 60° is higher in the order of the black ink of (A), the mixed color black ink of (B), and the color ink of (C), and under the condition that the degree of glossiness of the target recording surface at 60° is 40 or more, the ink jet recording method which satisfies one out of the condition of (1), that is, using a plurality of types of predetermined color inks of (C), forming an image, and forming an image which is different to the above image using predetermined color inks of (C) (Examples 1 to 6 and 8), or the condition of (2), that is, forming an image using the predetermined mixed color black ink of (B), and forming an image which is different to the above image using predetermined color inks of (C) (Example 7), is able to sufficiently prevent the generation of gloss unevenness in the boundary portions between black regions and color regions compared to other ink jet recording methods (each of the Comparative Examples).

Below, the results in the above-described Table 2 are considered; however, since the content of the above consideration include guesses, the range of the invention is not limited by the following contents.

It was discovered that the black tint of the recorded matters of Examples 3 and 4 was not particularly good. The reason for this is assumed to be that the composite black which is formed of each color ink of C, M, and Y which is able to reproduce a tint which is close to strict black is incomplete. In other words, it is assumed that since the Y ink is not used in Example 3 and the M ink is not used in Example 4, the composite black is not able to sufficiently reproduce the black and the tint of the black is slightly inferior. For Example 6, it is understood that the density of the black image tends to be inferior in comparison with Example 1 and the like, and the composite black image is a better image when combined with the black ink.

In addition, Example 6 obtains a recorded matter by forming respective images from the black ink 3 which corresponds to the above-described (A) which exhibits the achromatic black and the composite black which is formed of each of the color inks of C, M, and Y. Accordingly, in the above recorded matter, the color mixing of the ink, that is, the color mixing according to the black ink which contains the K pigment and the color pigment is not generated. In this manner, it is assumed that due to the color mixing not being generated, gloss unevenness is slightly generated in Example 6.

What is claimed is:

1. An ink jet recording method which uses one or more types of ink which are selected from a group comprising:
    (A) black ink which contains a pigment formed of one or more types of black pigment;
    (B) mixed color black ink which contains pigments formed of one or more types of black pigment and one or more types of color pigment; and
    (C) color ink which contains a pigment formed of one or more types of color pigment;
    wherein a degree of glossiness of the ink at 60° measured based on JIS Z 8741 is increased in an order of the black ink of (A), the mixed color black ink of (B), and the color ink of (C),
    the degree of glossiness of a target recording surface at 60° in a target recording medium measured based on JIS Z 8741 is 40 or more, and
    at least one condition of the below-described (1) and (2) is satisfied;
    (1) A black image is formed using at least a plurality of types of the color ink of (C) and a color image is formed using the color ink of (C), and
    (2) A black image is formed using the mixed color black ink of (B) and a color image is formed using the color ink of (C).

2. The ink jet recording method according to claim 1, wherein the condition of (1) and the condition of (2) are satisfied.

3. The ink jet recording method according to claim 1, wherein at least the condition of (2) is satisfied and a color pigment which is included in the mixed color black ink of (B) includes a cyan pigment.

4. The ink jet recording method according to claim 2, wherein the color pigment which is included in the mixed color black ink of (B) includes a cyan pigment.

5. The ink jet recording method according to claim 1, wherein a ratio of a total weight of the black pigment which is included in the mixed color black ink of (B) and a total weight of the color pigments (former:latter) is 1:1 to 1:0.2.

6. The ink jet recording method according to claim 1, wherein at least the condition of (1) is satisfied, and the black image is formed further using at least one out of the black ink of (A) or the mixed color black ink of (B).

7. The ink jet recording method according to claim 2, wherein the black image is formed further using at least one out of the black ink of (A) or the mixed color black ink of (B).

8. The ink jet recording method according to claim 1, wherein a mass ratio of an amount of the black pigment and an amount of the color pigment (former:latter) is 1:1 to 1:0.2 in an image which is formed on the target recording surface of the target recording medium using at least two out of the black ink of (A) and the mixed color black ink of (B), and the color ink of (C).

9. An ink jet recording apparatus which uses the ink jet recording method according to claim 1.

10. An ink jet recording apparatus which uses the ink jet recording method according to claim 2.

11. An ink jet recording apparatus which uses the ink jet recording method according to claim 3.

12. An ink jet recording apparatus which uses the ink jet recording method according to claim 4.

13. An ink jet recording apparatus which uses the ink jet recording method according to claim 5.

14. An ink jet recording apparatus which uses the ink jet recording method according to claim 6.

15. An ink jet recording apparatus which uses the ink jet recording method according to claim 7.

16. An ink jet recording apparatus which uses the ink jet recording method according to claim 8.

17. A recorded matter which is recorded using the ink jet recording method according to claim 1.

18. A recorded matter which is recorded using the ink jet recording method according to claim 2.

19. A recorded matter which is recorded using the ink jet recording method according to claim 3.

20. A recorded matter which is recorded using the ink jet recording method according to claim 4.

21. A recorded matter which is recorded using the ink jet recording apparatus according to claim 9.

22. A recorded matter which is recorded using the ink jet recording apparatus according to claim 10.

23. A recorded matter which is recorded using the ink jet recording apparatus according to claim 11.

24. A recorded matter which is recorded using the ink jet recording apparatus according to claim 12.

* * * * *